United States Patent [19]

Bruels

[11] 3,909,101

[45] Sept. 30, 1975

[54] WALL PLATE FOR FLEXIBLE CONDUIT

[76] Inventor: John F. Bruels, R.F.D. 1, Danielson, Conn. 06239

[22] Filed: June 15, 1973

[21] Appl. No.: 370,550

[52] U.S. Cl. ............... 339/107; 174/65 R; 174/72 R
[51] Int. Cl.² ......................................... H01R 13/58
[58] Field of Search ....... 339/105, 107, 28, 29, 175; 174/53, 64 R, 72 R, 72 C, 92

[56] References Cited
UNITED STATES PATENTS

| | | | |
|---|---|---|---|
| 1,039,670 | 9/1912 | Gagnon | 339/105 |
| 1,647,187 | 11/1927 | Moore | 174/53 |
| 1,648,582 | 11/1927 | Dodge | 174/53 UX |
| 1,887,784 | 11/1932 | Propp | 339/175 C X |
| 2,525,449 | 10/1950 | Coutant | 339/107 X |
| 2,810,115 | 10/1957 | Abbott | 174/92 X |
| 2,872,504 | 2/1959 | Woodring | 174/65 R |
| 3,573,714 | 4/1971 | Turner | 339/107 X |

FOREIGN PATENTS OR APPLICATIONS

| | | | |
|---|---|---|---|
| 24,847 | 10/1935 | Australia | 339/105 |
| 1,006,090 | 4/1952 | France | 339/105 |
| 893,678 | 10/1953 | Germany | 339/105 |

*Primary Examiner*—Richard E. Moore
*Attorney, Agent, or Firm*—J. Gibson Semmes

[57] ABSTRACT

An apparatus for conducting a flexible conduit such as an electrical, pneumatic or hydraulic conductor from an outlet in a flat surface such as a wall, comprising mounting plate means through which segments of lead conduit may be threaded, cover plate means for mating with said mounting plate means, means located on said cover plate means for locating and supporting connections between the segments of lead conduit and a segment of outlet conduit and interacting means located on said mounting and cover plate means for clamping said segment of outlet conduit and providing an aperture for threading the segment of outlet conduit exteriorly of the mounting and cover plate means, whereby an extended portion of the segment of outlet conduit may be attached to a suitable plug or connector to provide a flexible outlet.

1 Claim, 4 Drawing Figures

WALL PLATE FOR FLEXIBLE CONDUIT

FIELD OF THE INVENTION

The invention relates to wall outlets for flexible conduits used in electrical, pneumatic or hydraulic applications, in which the outlet provides a connection for a similar conduit attached to a movable apparatus operating on electrical, pneumatic or hydraulic power.

SUMMARY OF THE INVENTION

An object of the invention is to provide a power outlet which may be simply attached to conventional power lead conduits brought to an opening in a surface such as a wall and which includes an exteriorly extending portion of outlet power conduit having a conventional female socket or other connector affixed to the end thereof. The socket may thus be oriented as needed for connection to the male plug of an input power conduit from an apparatus to be operated, and will move easily, or flex, should the apparatus move to a new position. In the event that the apparatus stretches its input conduit taut, the input plug and outlet socket or connector may separate easily without placing any potentially damaging sideways strain on either the input plug or outlet socket.

The electrical form of the invention finds particular application in hospitals where it may be used with heavy, electrified beds. When such beds are moved without first removing the power plug from a conventional wall socket, the joint between the plug and socket frequently is subjected to severe sideways strain, which may cause damage to both the plug and socket with attendant dangers of shock and fire hazard. The invention permits all force to be taken along the line of the inlet and outlet conduits to break the connection without damage. The pneumatic and hydraulic applications for this invention are analogous, as will be apparent to one of ordinary skill in the art.

DESCRIPTION OF THE PREFERRED EMBODIMENT

There follows a detailed description of the invention, reference being had to the drawings in which like numerals depict like elements of structure in the FIGURES.

Figure 1:
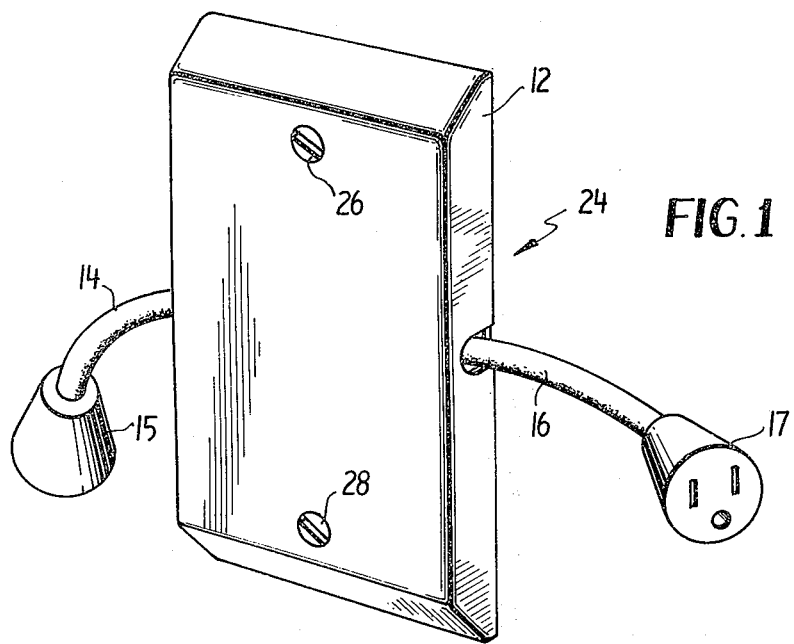
FIG. 1 shows a perspective view of the invention as it appears installed.

FIG. 1 shows the invention as it appears when installed for use as a flexible electrical outlet. Mounting plate 10, FIG. 3; cover plate 12; outlet conduits 14 and 16 with sockets 15 and 17; and lead conduits 18, 20 and 22, FIG. 4, have been assembled into unit 24, which may be attached to the threaded holes in a conventional junction box located in the wall using screws 26 and 28, after power lead conduits 18, 20 and 22 have been connected to the power lead conduits leading into the junction box. Unit 24 may be preassembled for installation at the site or may be assembled from components, as required to suit the particular need.

Figure 2:
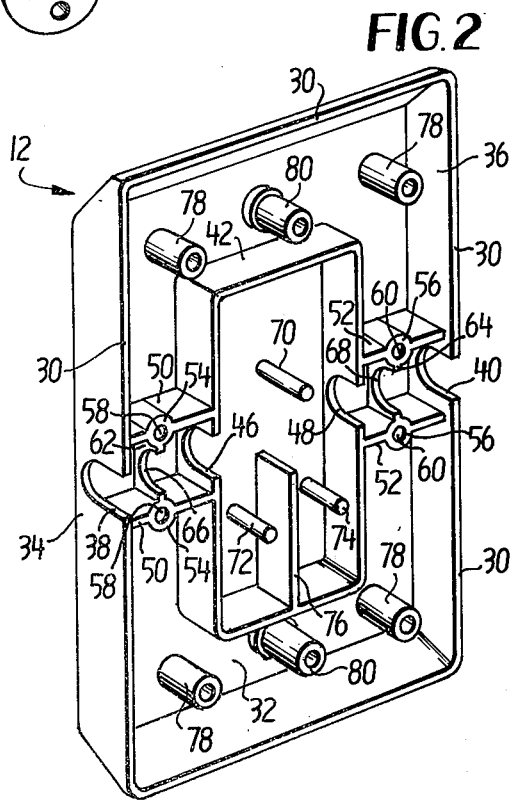
FIG. 2 shows a perspective view of the back surface of the cover plate.

FIG. 2 shows a perspective view of the back of cover plate 12. Both cover plate 12 and mounting plate 10 may be molded from a suitable high-strength fire-retardent plastic. Cover plate 12 is a recessed, rectangular structure having peripheral wall 30 extending from the face plane 32 thereof. Located at approximately opposite locations on edges 34 and 36 and extending through wall 30 are rounded notches 38 and 40 for outlet conduits 14 and 16. The inner dimensions of wall 30 are selected to permit mounting plate 10 to fit snugly therein for a compact assembly into unit 24. Centered on face plane 32 and spaced from wall 30 is conduit joint protection wall 42 which is integral with and extends upwardly from face plane 32 to a distance below the peripheral lip of wall 30 approximately equal to the thickness of base plane 44 of mounting plate 10. Located in protection wall 42 opposite notches 38 and 40 are notches 46 and 48 for outlet conduits 14 and 16.

Spanning the gap between walls 30 and 42 on either side of opposing notches 38-46 and 40-48 are pairs of ribs 50 and 52, respectively, extending upwardly from face plane 32 to the height of wall 42. Located approximately in the center of ribs 50 and 52 are pairs of bosses 54 and 56 including pairs of bores 58 and 60 which may or may not be tapped depending on the type of screws used to attach mounting plate 10 to cover plate 12. Ribs 62 and 64 extend between bosses 54 and 56 and include notches 66 and 68 located opposite notches 38-46 and 40-48, respectively. All notches 38-66-46 and 40-68-48 are sized so as to snugly receive outlet conduits 14 and 16 therein, for reasons to be discussed.

Located in the space enclosed by protection wall 42, are three conduit locating pins 70, 72 and 74, which extend upwardly from face plane 32 to the height of wall 30. Pin 70 is centrally located on one side of the space relative to notches 46 and 48, while pins 72 and 74 are located on the other side of notches 46 and 48 on opposite sides of insulation barrier 76, which extends from face plane 32 to the height of wall 42. Located in the gap between walls 30 and 42 near the corners thereof are raised, counterbored bosses 78 which may or may not be tapped depending on the type of screws used to attach mounting plate 10 to cover plate 12. Also located in this gap are centrally located bosses 80 which are drilled through to receive screws 26 and 28.

Figure 3:
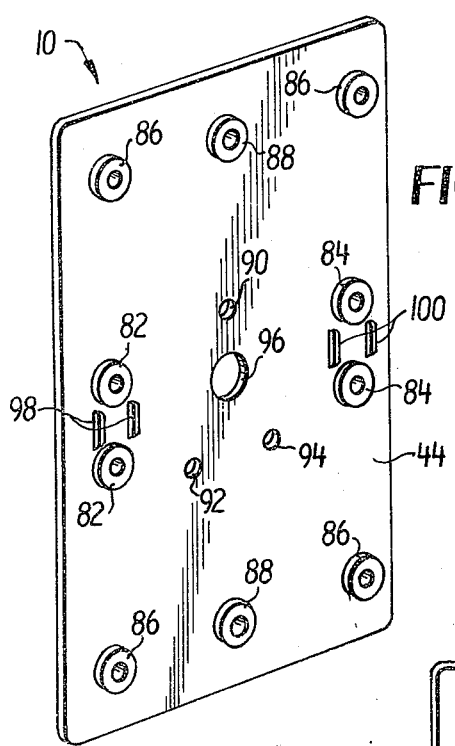
FIG. 3 shows a perspective view of the front surface of the mounting plate.

FIG. 3 shows a perspective view of the front surface of mounting plate 10. Base plane 44 includes various embossments and holes located to mate with corresponding portions of cover plate 12 when unit 24 is assembled. Bosses 82 and 84 are drilled through and counterbored from the opposite side and positioned to receive screws which mate with bores 58 and 60 in bosses 54 and 56 of cover plate 12. Similarly, bored and counterbored bosses 86 correspond to bosses 78 in cover plate 12. Holes 88 correspond to bosses 80; and holes 90, 92 and 94 to conduit locating pins 70, 72 and 74. Hole 96 permits lead conduits 18, 20 and 22 be threaded out of unit 24 for attachment at the junction box.

Pairs of ribs 98 and 100 extend upwardly from base plane 44 and are positioned so as to extend into the spaces between ribs 62 and 64 and walls 34 and 42, respectively. The height of ribs 98 and 100 is such that conduits 14 and 16 will be depressed on either side of ribs 62 and 64 to apply pressure to conduits 14 and 16 when unit 24 is assembled.

Figure 4:
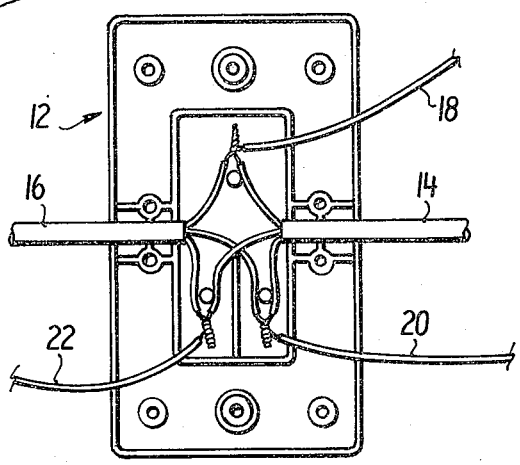
FIG. 4 shows a plan view of the back surfaces of the cover plate indicating the manner in which the conduits all are located therein and joined to one another in use.

FIG. 4 shows a plan view of the back surface of cover plate 12 during assembly of unit 24. It is assumed that a three wire power lead conduit and two outlet conduits only are in use. Lead conduits 18, 20 and 22 are preassembled in parallel to their counterparts in conduits 14 and 16, as indicated. Conduits 14 and 16 are then pressed snugly into notches 38-66-46 and 40-68-48. The joints between the lead conduits and conduits 14 and 16 are looped over conduit locating pins 70, 72 and 74. At this point lead conduits 18, 20 and 22 may be drawn through hole 96 in mounting plate 10 and mounting plate 10 slid down so that pins 70, 72 and 74 enter holes 90, 92 and 94. Mounting plate 10 is then securely fastened to cover plate 12 using screws through bosses 82, 84 and 86. As mounting plate 10 seats on the upper lip of protection wall 42, ribs 98 and 100 depress conduits 14 and 16 into the spaces on either side of ribs 62 and 64. Unit 24 is then ready for installation in a standard junction box.

The coaction of ribs 62 and 64 with ribs 98 and 100 grips conduits 14 and 16 and provides a strain relief whereby most tension exerted on conduits 14 and 16 is absorbed by the interacting ribs. This minimizes strain on the joints between the power lead conduits and the outlet conduits. Pins 70, 72 and 74 provide further protection or strain relief for these joints by absorbing some of the tensile force transmitted to the joints by the outlet conduit and preventing the joints from straightening and breaking under an increased load. These pins also serve to maintain the joints separate, thereby minimizing the chance of electrical short circuits.

Although the preferred embodiment is disclosed as an electrical outlet, it is apparent that the invention may also be used for flexibly connecting flexible hydraulic and pneumatic conduits, where separate lead conduits are joined in parallel to a plurality of flexible outlet conduits. For example, the invention could be used to permit parallel operation of a plurality of devices using a remote pneumatic switch operating apparatus similar to that shown in Downs, et al., U.S. Pat. No. 3,080,720.

Having described my invention in such complete detail as to enable one in the art to make and use it, I claim:

1. A power outlet comprising:
   A. at least one length of flexible outlet conduit having a socket connector on one end thereof;
   B. a mounting plate;
   C. means coacting with the mounting plate for gripping the at least one length of flexible outlet conduit between the one end and the other end thereof;
   D. at least one length of flexible power lead conduit connected to form a common electrical connection with the at least one length of flexible outlet conduit;
   E. means coacting with the mounting plate for absorbing tensile strain placed on the common electrical connection between the power lead conduit and the flexible outlet conduit, comprising
      E1. a cover plate having at least one outwardly extending pin element thereon; and
      E2. means for securing the cover plate to the mounting plate, the power lead and the flexible outlet lead being looped around the pin at which the common electrical connection is formed to permit the pin to absorb tensile strain placed on the common electrical connection, the said at least one extending pin element being positioned out of alignment relative to the means for gripping.

* * * * *